United States Patent
Kejariwal et al.

(10) Patent No.: US 8,458,170 B2
(45) Date of Patent: Jun. 4, 2013

(54) PREFETCHING DATA FOR DOCUMENT RANKING

(75) Inventors: Arun Kejariwal, San Jose, CA (US); Girish Vaitheeswaran, Fremont, CA (US); Sapan Panigrahi, Castro Valley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1015 days.

(21) Appl. No.: 12/165,307

(22) Filed: Jun. 30, 2008

(65) Prior Publication Data

US 2009/0327274 A1 Dec. 31, 2009

(51) Int. Cl.
*G06F 17/30* (2006.01)

(52) U.S. Cl.
USPC .......................................................... 707/723

(58) Field of Classification Search
USPC .......................... 707/602, 706, 723, 748, 797
See application file for complete search history.

(56) References Cited

U.S. PATENT DOCUMENTS

| | | | | |
|---|---|---|---|---|
| 4,682,365 A * | 7/1987 | Orita et al. | .................... | 382/159 |
| 4,807,110 A * | 2/1989 | Pomerene et al. | ............ | 711/213 |
| 5,410,613 A * | 4/1995 | Suzuki | .......................... | 382/159 |
| 6,023,726 A * | 2/2000 | Saksena | ....................... | 709/219 |
| 6,055,572 A * | 4/2000 | Saksena | ....................... | 709/224 |
| 6,167,438 A * | 12/2000 | Yates et al. | ..................... | 709/216 |
| 6,397,258 B1 * | 5/2002 | Tsuji et al. | .................... | 709/233 |
| 6,556,952 B1 * | 4/2003 | Magro | ........................... | 702/183 |
| 6,560,693 B1 * | 5/2003 | Puzak et al. | ................... | 712/207 |
| 6,957,306 B2 * | 10/2005 | So et al. | ......................... | 711/137 |
| 7,031,948 B2 * | 4/2006 | Lee | .................................. | 706/14 |
| 7,096,348 B2 * | 8/2006 | Moyer et al. | .................. | 712/238 |
| 7,346,741 B1 * | 3/2008 | Keish et al. | ..................... | 711/137 |
| 7,383,393 B2 * | 6/2008 | Al Sukhni et al. | ............. | 711/137 |
| 7,487,296 B1 * | 2/2009 | Iacobovici et al. | ............ | 711/137 |
| 7,509,459 B2 * | 3/2009 | Diefendorff | ................... | 711/137 |
| 7,761,447 B2 * | 7/2010 | Brill et al. | ...................... | 707/728 |
| 2003/0097357 A1 * | 5/2003 | Ferrari et al. | ...................... | 707/3 |
| 2003/0195940 A1 * | 10/2003 | Basu et al. | ..................... | 709/213 |
| 2004/0098245 A1 * | 5/2004 | Walker et al. | ..................... | 704/1 |
| 2004/0139072 A1 * | 7/2004 | Broder et al. | ...................... | 707/4 |
| 2004/0215606 A1 | 10/2004 | Cossock | | |
| 2004/0260621 A1 * | 12/2004 | Foster et al. | .................... | 705/26 |
| 2005/0131853 A1 | 6/2005 | Sampath et al. | | |
| 2005/0193160 A1 | 9/2005 | Bhatt et al. | | |
| 2006/0206479 A1 * | 9/2006 | Mason | .............. | 707/5 |
| 2006/0206516 A1 * | 9/2006 | Mason | .......................... | 707/102 |
| 2008/0005736 A1 * | 1/2008 | Apacible et al. | .............. | 718/100 |
| 2008/0101689 A1 * | 5/2008 | Forman | .......................... | 382/159 |
| 2009/0158005 A1 * | 6/2009 | Carmichael | ..................... | 711/213 |
| 2009/0210470 A1 * | 8/2009 | Sarlos et al. | ................... | 708/400 |
| 2009/0254774 A1 * | 10/2009 | Chamdani et al. | ................. | 714/2 |

OTHER PUBLICATIONS

Ajay et al, "Web Proxy Server with Intelligent Prefetcher for Dynamic Pages Using Association Rules", Jan. 26, 2001, Department of Computer Science and Engineering University of Minnesota, 27 pages.*

(Continued)

*Primary Examiner* — Cam-Linh Nguyen

(74) *Attorney, Agent, or Firm* — Berkeley Law & Technology Group, LLP

(57) ABSTRACT

The subject matter disclosed herein relates to prefetching data for use in ranking of electronic documents via a document ranking component.

20 Claims, 5 Drawing Sheets

OTHER PUBLICATIONS

Mowry et al., "Automatic Compiler-Inserted I/O Prefetching for Out-of-Core Applications" Proceedings of the Second Symposium on Operating Systems Design and Implementation (OSDI '96), Seattle, WA, Oct. 23-31, 1996, 15 pages.

Ortega et al., "Cost-Effective Compiler Directed Memory Prefetching and Bypassing" Proceedings of the 2002 International Conference on Parallel Architectures and Compilation Techniques (PACT '02), IEEE, 2002, 10 pages.

Callahan et al., "Software Prefetching" ACM, 1991, pp. 40-52.

Chen et al., "Improving Index Performance Through Prefetching" ACM SIGMOD 2001, Santa Barbara, CA, May 21-24, 2001, pp. 235-246.

Joseph et al., "Prefetching Using Markov Predictors" ISCA '97, Denver, CO, 1997, pp. 252-263.

Lipasti et al., "SPAID: Software Prefetching in Pointer- and Call-Intensive Environments" IEEE, Proceedings of MICRO-28, 1995, pp. 231-236.

Luk et al., "Compiler-Based Prefetching for Recursive Data Structures" ASPLOS VII, MA, Oct. 1996, pp. 222-233.

Luk et al., "Automatic Compiler-Inserted Prefetching for Pointer-Based Applications" IEEE Transactions on Computers, vol. 48, No. 2, Feb. 1999, 7 pages.

* cited by examiner

PREFETCHING DATA FOR DOCUMENT RANKING

BACKGROUND

Data processing tools and techniques continue to improve. Information in the form of data is continually being generated or otherwise identified, collected, stored, shared, and analyzed. Databases and other like data repositories are commonplace, as are related communication networks and computing resources that provide access to such information.

The Internet is ubiquitous; the World Wide Web provided by the Internet continues to grow with new information seemingly being added every second. To provide access to such information, tools and services are often provided, which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and systems that allow for pertinent information to be analyzed in an efficient manner. Search engines, such as, for example, those provided over the web by Yahoo!, Google, and other web sites may be used by individuals to gather information. Typically, a user may input a query term and/or phrase and the search engine may return one or more links to sites and/or documents related to the query. The links returned may be related, or they may be completely unrelated, to what the user was actually looking for. The "relatedness" of results to the query may be in part a function of the actual query entered as well as the robustness of the search system (underlying collection system) used.

Growth in the number of available web pages may make searching for relevant information difficult. To this end, various search engines have been developed over the last decade. One of the components of a search engine may rank electronic documents corresponding to a query specified by a user in order of relevance. Such document ranking may be done based on a multitude of metrics such as degree of query match and freshness of the document. Other metrics may be utilized in advanced rankings of electronic documents to improve the quality of search results. However, such an increase in metrics may adversely affect the query processing time.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
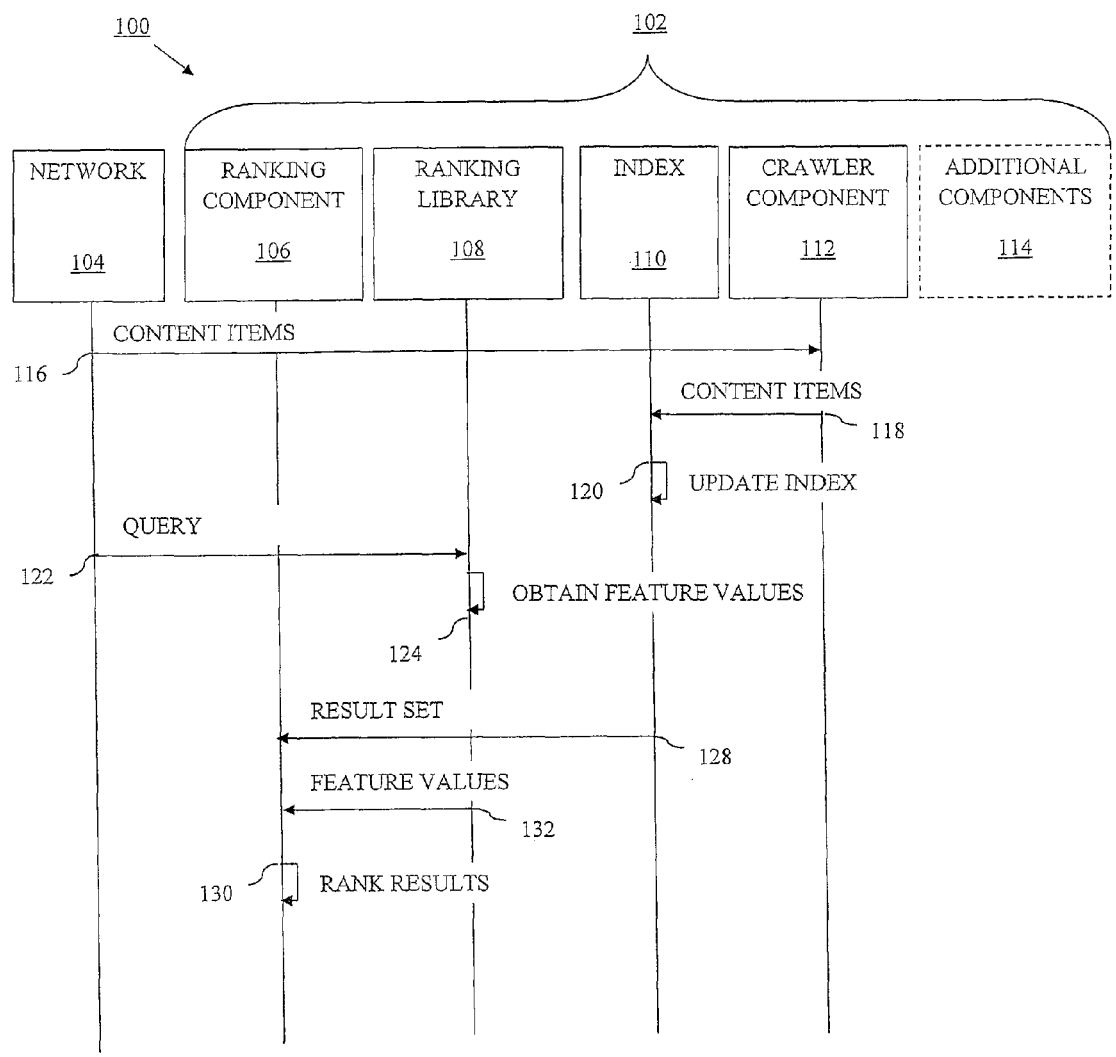
FIG. 1 is a flow diagram illustrating a procedure for indexing and/or ranking electronic documents in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

As discussed above, growth in the number of available web pages may make searching for relevant information difficult. To this end, various search engines have been developed over the last decade. One of the components of a search engine may rank electronic documents corresponding to a query specified by a user in order of relevance. Such document ranking may be done based on a multitude of metrics such as degree of query match and freshness of the document. Other metrics may be utilized in advanced rankings of electronic documents to improve the quality of search results. However, such an increase in metrics for use in advanced rankings of electronic documents may adversely affect the query processing time.

As will be described in greater detail below, embodiments described herein relate to prefetching data for use in ranking of electronic documents via a document ranking component. Such prefetching techniques and/or other procedures, as described below, may be utilized to improve search engine run-time performance for electronic document ranking. Accordingly, advanced rankings of electronic documents may be performed with a reduced impact on query processing time, based at least in part on improving run-time performance via prefetching techniques and/or other procedures.

As will be described in greater detail below, embodiments described herein relate to changing a layout and/or flow of data through compiler based procedures. For example, such compiler based procedures may leverage an instruction-set architecture (ISA) for prefetching operations and exploit underlying micro-architecture of a given computing platform to improve performance. In contrast, existing approaches that focus at algorithmic level optimizations may be not address an underlying micro-architecture of a given computing platform. Further, compiler based procedures may be applied to a search engine without directly reworking the algorithm of the search engine itself. Additionally or alternatively, such compiler based procedures may be applied to more than one search engine, without directly reworking the algorithms of each search engine individually. Such changes to the layout and/or flow of data for a given search engine may be utilized to deliver data to a processor in a timely manner. For example, in situations where data is not delivered to a processor in a timely manner, cache misses and/or processor stalls may adversely impact run-time performance.

Procedure 100 illustrated in FIG. 1 may be used to index and/or rank electronic documents in accordance with one or more embodiments, for example, although the scope of claimed subject matter is not limited in this respect. Additionally, although procedure 100, as shown in FIG. 1, comprises one particular order of actions, the order in which the actions are presented does not necessarily limit claimed subject matter to any particular order. Likewise, intervening actions not shown in FIG. 1 and/or additional actions not shown in FIG. 1 may be employed and/or actions shown in FIG. 1 may be eliminated, without departing from the scope of claimed subject matter.

Procedure 100 depicted in FIG. 1 may in alternative embodiments be implemented in software, hardware, and/or firmware, and may comprise discrete operations. As illustrated, procedure 100 governs the operation of a search engine 102. Search engine 102 may be capable of searching for content items of interest. Search engine 102 may communicate with a network 104 to access and/or search available information sources. By way of example, but not limitation, network 104 may include a local area network, a wide area network, the like, and/or combinations thereof, such as, for example, the Internet. Additionally or alternatively, search engine 102 and its constituent components may be deployed across network 104 in a distributed manner, whereby components may be duplicated and/or strategically placed throughout network 104 for increased performance.

Search engine 102 may include multiple components. For example, search engine 102 may include a ranking component 106, a ranking library 108, an index 110, and/or a crawler component 112, as will be discussed in greater detail below. Additionally or alternatively, search engine 102 also may include additional components 114 that are not described in detail herein. For example, search engine 102 also may include a search component capable of searching the content items retrieved by crawler component 112.

Additionally, although the additional components 114 of search engine 102, as shown in FIG. 1, have been described above with non-limiting example components, the examples given do not necessarily limit claimed subject matter to any particular configuration. For example, further additional components 114 not discussed with respect to FIG. 1 may be employed, without departing from the scope of claimed subject matter. Further, although the additional components 114 of search engine 102, as shown in FIG. 1, have been described above with non-limiting example components, the examples given may be eliminated, without departing from the scope of claimed subject matter.

Crawler component 112 may retrieve content items from network 104, as illustrated at action 116. For example, crawler component 112 may retrieve content items and store a copy in a cache (not shown). Additionally, crawler component 112 may follow links between content items so as to navigate across the Internet and gather information on an extensive number of electronic documents. For example, such content items may comprise a set of electronic documents retrieved from network 104.

As used herein, the term "electronic document" is meant to include any information in a digital format that may be perceived by a user if displayed by a digital device, such as, for example, a computing platform. For one or more embodiments, an electronic document may comprise a web page coded in a markup language, such as, for example, HTML (hypertext markup language). However, the scope of claimed subject matter is not limited in this respect. Also, for one or more embodiments, the electronic document may comprise a number of elements. The elements in one or more embodiments may comprise text, for example, as may be displayed on a web page. Also, for one or more embodiments, the elements may comprise a graphical object, such as, for example, a digital image.

Data from content items gathered by crawler component 112 may be sent to index 110, as illustrated at action 118. Index 110 may index such content items, as illustrated at action 120. For example, index 110 may be updated based at least in part on content items comprising a set of electronic documents. Index 110 may parse a given content item into indexable terms, such as concepts and/or entities. Additionally, identifying information of the electronic documents associated with such concepts and/or entities also may be indexed so that a given concept and/or entity may be located via a corresponding electronic document. Index 110 may index terms and may store information regarding which documents contain a given concept and/or entity based at least in part on such indexed terms. However, index 110 may not necessarily index a complete series of terms associated with a given concept and/or entity. For example, an entity "Tom Cruise" may be indexed based at least in part on the single term "tom" and/or on the single term "cruise". In such a case, index 110 may store which electronic documents contain such single terms, and/or may store information regarding an offset and/or position of such single terms within such electronic documents. Accordingly, search engine 102 may determine which electronic documents contain an entity "Tom Cruise" based at least in part on checking a position of the individual terms "tom" and/or "cruise" within such electronic documents.

Ranking library 108 may obtain data regarding feature values that may associate a numerical value to an electronic document, a term from an electronic document, and/or some other aspect of an electronic document, as illustrated at action 122. Such feature values may be determined based at least in part on a comparison of terms from a query with aspects of one or more electronic documents. For example, a feature value may be determined so as to indicate the degree that individual terms and/or groups of terms from a query match with individual terms and/or groups of terms associated with a given electronic document. Additionally or alternatively, such feature values may be determined based at least in part on aspects of an electronic document itself without a comparison to a query. For example, a feature value may be determined that corresponds to an indication of whether an electronic document relates to "entertainment" information, "news" information, and/or the like.

Ranking component 106 may receive a search result set from index 110 based at least in part on query 122, as illustrated at action 128. For example, search engine 102 also may include a search component (not shown) capable of searching the electronic documents indexed within index 110 so as to generate a result set. Ranking component 106 may be capable of ranking such a result set such that the most relevant electronic documents in the result set are presented to a user first, according to descending relevance, as illustrated at action 130. For example, the first electronic document in the result set may be the most relevant in response to a query and the last electronic document in the result set may be the least relevant while still falling within the scope of the query. Such a ranked result set may comprise a search result that may be transmitted to a user via a search interface.

Such a ranking procedure may be based at least in part on the feature values from ranking library 108. Such feature values may be transferred to ranking component 106 from ranking library 108, as illustrated at action 132. Ranking library 108 may store such feature values within a structure, such as an array, for example. Such feature values may be stored within index 110, for example. Further, feature values may be computed at runtime, e.g., during the execution of a given query, and may not necessarily be stored prior to being transferred to ranking component 106.

Once ranking component 106 has received a result set and feature values, ranking component 106 may determine an importance score associated with the electronic documents from the result set based at least in part on such feature values. Such an importance score may be assigned to electronic documents depending on the traversing of one or more trees based at least in part on feature values associated with such electronic documents.

Figure 2:
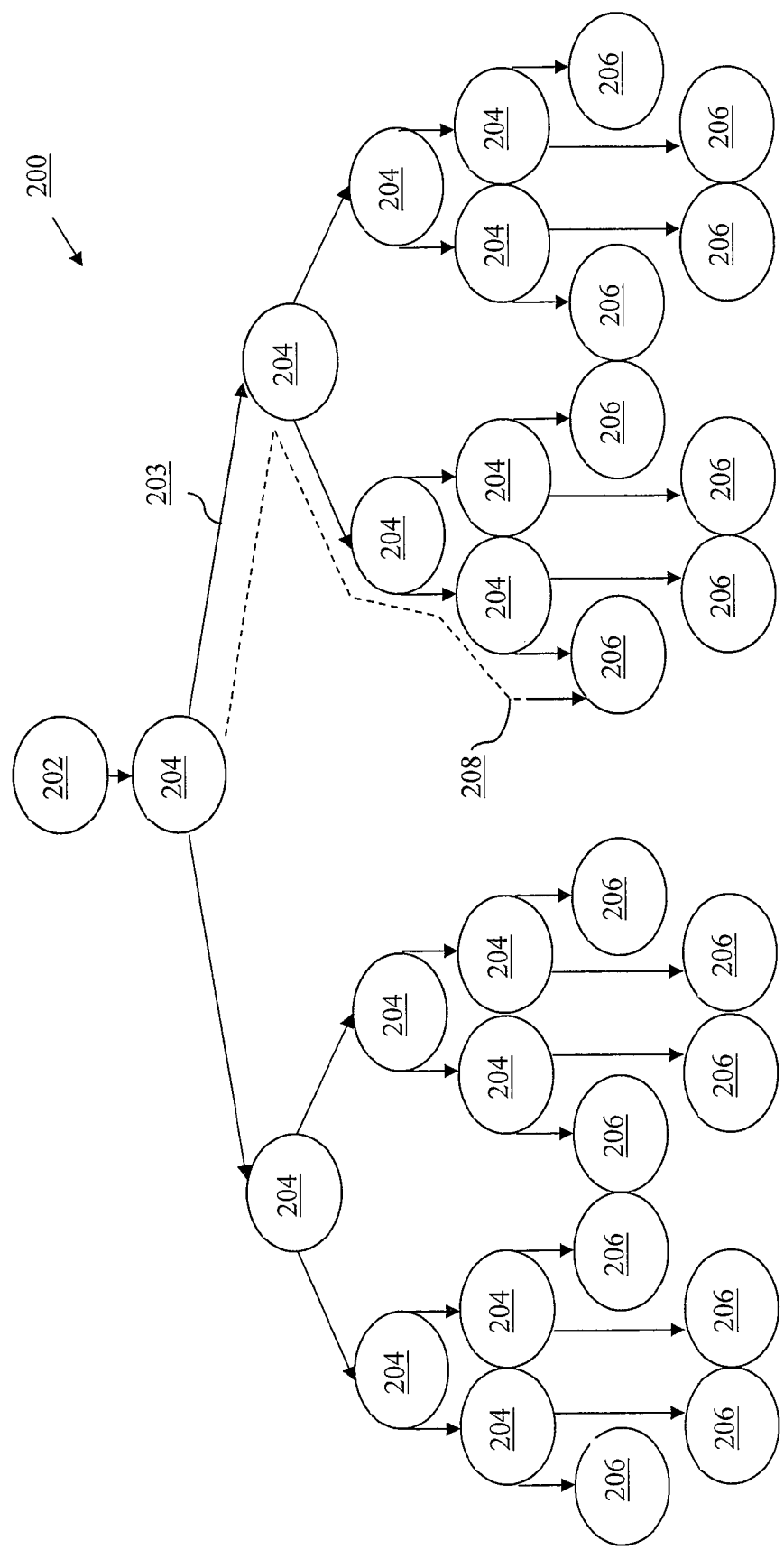
FIG. 2 is a schematic diagram of a tree for use in document ranking in accordance with one or more embodiments.

Referring to FIG. 2, a schematic diagram of a tree for use in document ranking is illustrated. As discussed above ranking component 106 (FIG. 1) may comprise one or more trees 200. Here, trees 200 may express and/or represent such hierarchical information in any one of several forms such as, for example, a computer accessible memory. Information in such a tree 200 may be expressed as a finite, rooted, connected, acyclic graph. In general, such a tree 200 may comprise a root node 202 that may not have any preceding parent nodes. Such a root node 202 may be a node at which operations on a tree 200 may begin. Such a tree 200 may be traversed via edges 203 to reach a given leaf node 206. A leaf node 206 may comprise a node that may not have any subsequent child nodes. Such a leaf node 206 may represent a possible value of a target variable based at least in part on given values of variables represented by a path 208 between a root 202 and a given leaf node 206. An interior node 204 may have a preceding parent node, such as a root node 202 or another interior node 204, and may have subsequent child nodes, such as leaf nodes 206 or other interior nodes 204.

Such decision tress 202 may be utilized to determine a value associated with a given item, such as an electronic document. Ranking component 106 (FIG. 1) may comprise a ranking algorithm wherein a score of associated with an electronic document may be incremented in an iterative fashion based at least in part on one or more trees. Such iterations may involve traversing a tree guided by characteristics associated with a given electronic document. On traversing a leaf node 206, a score of associated with a given electronic document may be incremented by the value associated with that particular leaf node 206. Such a procedure may be illustrated by the following example portion of code:

```
for each tree
    ...
    int nNodes = numNodes[i];
    // traverse each tree
    while (1)
        ...
        if (cond)
            break
    end while
    // update the document score
    _score += leaves [...]
    ...
end for
``` where trees 200 may be traversed to obtain a "score" of a given electronic document. Such a score may be updated to include the value of addition "leaves" corresponding with leaf nodes 206.

For example, ranking component 106 (FIG. 1) may rank a given electronic document by taking one or more feature values associated with the electronic document and comparing such feature values with one or more threshold values associated with one or more nodes contained within one or more trees 202. As used herein, the term "threshold value" may refer to a value associated with a node of a tree that may be capable of indicating which edge 203 of a tree should be followed when such a threshold value is compared to a given feature value. For example, such a feature value may be compared to such threshold values by traversing root node 202 and various interior nodes 204 of a given decision tree 202 to reach a target value associated with a given leaf node 206. Such a leaf node 206 may represent a possible target value based at least in part on values of the variables represented by the particular path 208 leading from the root node 202 to the particular leaf node 206 via the internal nodes 204. Such operations may be referred to as "walking the tree" and/or "traversing the tree".

Figure 3:
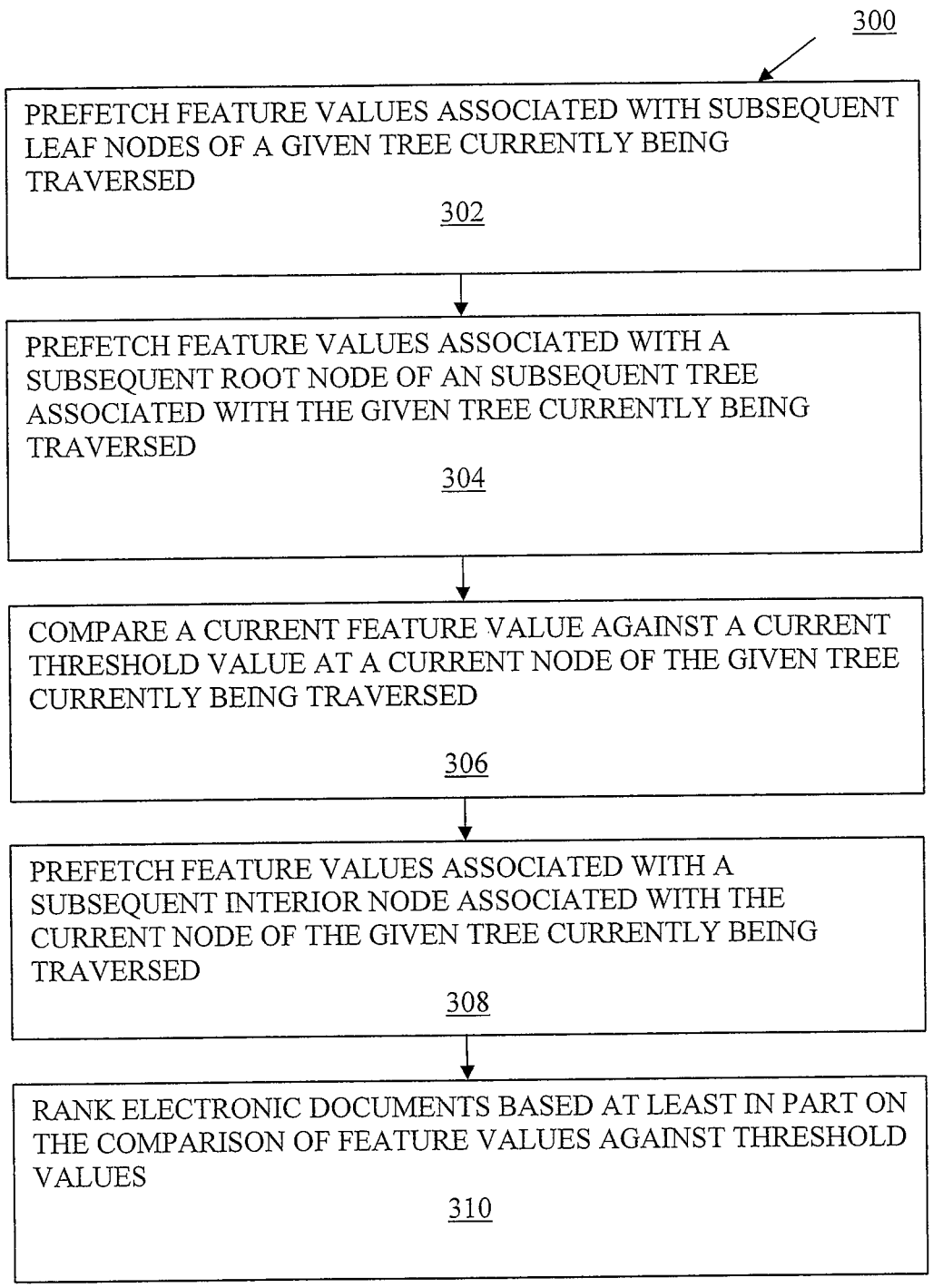
FIG. 3 is a flow diagram illustrating a procedure for prefetching data for use in ranking of electronic documents in accordance with one or more embodiments.

Procedure 300, as illustrated in FIG. 3, may be used to prefetch data for use in ranking of electronic documents in accordance with one or more embodiments, for example, although the scope of claimed subject matter is not limited in this respect. Additionally, although procedure 300, as shown in FIG. 3, comprises one particular order of blocks, the order in which the blocks are presented does not necessarily limit claimed subject matter to any particular order. Likewise, intervening blocks shown in FIG. 3 and/or additional blocks not shown in FIG. 3 may be employed and/or blocks shown in FIG. 3 may be eliminated, without departing from the scope of claimed subject matter.

As illustrated, procedure 300 may be used for prefetching data for use in ranking of electronic documents via a document ranking component. During compilation, code associated with a ranking component 106 (FIG. 1) may be interpreted from a source code into an executable instruction. During such an interpretation, a compiler component may introduce and/or define one or more prefetching operations. Such prefetching may be utilized to supply a processor with data in a timely manner. Procedure 300 may prefetch one or more feature values associated with one or more electronic documents starting at block 302 where prefetching may be performed on at least a portion of the one or more feature values associated with subsequent leaf nodes of a given tree currently being traversed. At block 304, prefetching may be performed on at least a portion of the one or more feature values associated with a subsequent root node of a subsequent tree associated with the given tree currently being traversed. As will be described below in greater detail, such prefetching operations from block 302 and/or block 304 may reduce cache misses. Such cache misses may refer to a failed attempt to read or write a piece of data in the cache. Further, such cache misses may result in a main memory access that may have a longer latency as compared to an access to a portion of a multilevel cache, for example.

Such prefetching operations from block 302 and/or block 304 may comprise prefetching the one or more feature values from a main memory into a portion of a multilevel cache. For example, such prefetching operations from block 302 and/or block 304 may comprise prefetching the one or more feature values from a main memory into an L2 cache of a multilevel cache. Another issue is the fundamental tradeoff between cache latency and hit rate. Larger caches have better hit rates but longer latency. To address this tradeoff, many computers use multiple levels of cache, with small fast caches backed up by larger, slower caches. Multi-level caches may generally operate to address tradeoffs between cache latency and cache misses. Larger caches may have a reduced probability of cache misses associated with an increased average latency. Conversely, smaller caches may have an increased probability of cache misses associated with a reduced average latency. Multi-level caches may generally operate by checking, a smallest Level 1 (L1) cache first. If there are no cache misses, the processor may proceed at high speed based on the data from L1 cache. If L1 cache misses, the next larger cache (L2) may be checked, and so on, before a main memory is checked.

At block 306, a current feature value may be compared against a current threshold value at a current node of the given tree currently being traversed. At block 308, prefetching may be performed on at least a portion of the one or more feature values associated with a subsequent interior node associated with the current node of the given tree currently being traversed. Like prefetching operations from blocks 302/304, prefetching operations from block 308 may reduce cache misses for the same and/or similar reasons. Additionally, a comparison at a current node of a current feature value against a current threshold value may be utilized to traverse or walk a given tree. As described above, once ranking component 106 (not shown) has received a result set and corresponding feature values, ranking component 106 may determine an importance score associated with the electronic documents from the result set based at least in part on such feature values. Such an importance score may be assigned to electronic documents depending on the traversing one or more trees based at least in part on feature values associated with such electronic documents. Such threshold values may refer to a value associated with a node of a tree that may be capable of indicating which branch of a tree should be followed when such a threshold value is compared to a given feature value. For example, such a feature value may be compared to such threshold values by stepping through root node and various interior nodes of a given tree to reach a target value associated with a given leaf node. Such a leaf node may represent a possible target value based at least in part on values of the variables represented by the particular path leading from the root node to the particular leaf node via the internal nodes. Such operations may be referred to as "walking the tree" and/or "traversing the tree".

Such prefetching operations of procedure 300 may be partially illustrated by the following example portion of code:

```
for each tree
    ...
    // prefetch leaves[i*16]                                           (A)
    __builtin__prefetch (&leaves[i*16], 0, 0);
    // prefetch the value for the root of the next tree                (B)
    __builtin__prefetch (&fValue[((nodes + 15)[0]).fname], 0, 0);
    while                                                              (1) {
        ...
        nextNode = (fValue[tn.fname] < tn.threshold ? tn.left : tn.right);
        // prefetch fValue of the next node                            (C)
        __builtin__prefetch (&fValue[(nodes[nextNode]).fname], 0, 0);
        ...
    }
    __score += leaves[nextNode - 15];
    ...
}
``` where instruction (A) illustrates prefetching operations from block 302, instruction (B) illustrates prefetching operations from block 304, and instruction (C) illustrates prefetching operations from block 308.

Regarding instruction (A) illustrating prefetching operations from block 302, feature values in an array fValue may be prefetched corresponding to the leaves in a given tree. A value of '0' in the second argument of a feature value may signify that the feature value being prefetched is read only. A value of '1' in the third argument of a feature value may signify that there is temporal locality in the feature value being prefetched. Such a temporal locality in the feature value being prefetched may indicate that a cache line containing the prefetched value may be available for replacement being read and/or that a L2 cache in a processor may be shared between multiple processing cores and its size may be limited. An execution of a while loop (1) after the issue of prefetch instruction (A) and before the read of a feature value being prefetched may ensure that a prefetched value will be in the cache before a read of such a prefetched value. While loop (1) may correspond to operations of tree traversal. Such an organization of the code may avoid issuing a prefetch too early and/or avoid issuing a prefetch too late. Specifically, issuing a prefetch too early may result in polluting the cache by replacing more desirable cache lines, thereby, causing additional cache misses. Similarly, issuing a prefetch too late may result in execution overheard without reducing the number of L2 data cache misses.

Regarding instruction (C) illustrating prefetching operations from block 308, feature values in an array fValue may be prefetched corresponding to children of the current node of the given tree. An execution of a while loop (1) includes the issue of prefetch instruction (C). As discussed above, while loop (1) may correspond to the operations of tree traversal. There may only be a small amount of computation between the prefetch instruction (C) and the corresponding read of the feature value being prefetched. However, given the size of a given cache line as well as the given size of an individual feature value in the array fValue a prefetch may implicitly bring in additional nodes of the tree for later use. For example, the size of a given cache line may be 64 bytes in an Intel® Core™ Duo processor, while the size of an individual feature value in the array fValue may be 8 bytes. Accordingly, a prefetched cache line, including an individual feature value, may implicitly bring in additional nodes of the tree for later use.

Regarding instruction (B) illustrating prefetching operations from block 304, feature values in an array fValue may be prefetched corresponding to a root of the next tree to be traversed. An execution of prefetch instruction (B) may also minimize the number of L2 data cache misses. Similar to the operation of prefetch instruction (A), while loop (1) may be executed after the issue of prefetch instruction (B) and before the read of a feature value being prefetched. Accordingly, a prefetched value may be in the cache before a read of such a prefetched value.

Additionally or alternatively, prefetching operations from blocks 302, 304, and/or 308 may not require a guard. Specifically, such prefetching operations may be non-faulting. For example, if an input memory address to prefetching operations from blocks 302, 304, and/or 308 is invalid; such prefetching operations may not give rise to an exception. Instead, prefetching operations from blocks 302, 304, and/or 308 may be considered as a no operation-type command that effectively does nothing at all.

At block 310, electronic documents may be ranked via a document ranking component. Such a ranking may be based at least in part on a comparison of the feature values against one or more threshold values associated with one or more trees. As described above, ranking component 106 (not shown) may comprise a ranking algorithm wherein a score of an electronic document may be incremented in an iterative fashion based at least in part on one or more trees. Such iterations may involve traversing a tree guided by characteristics associated with a given electronic document. On reaching a leaf node, a score of a given electronic document may be incremented by the value stored in that particular leaf node 206. Such a score may be utilized by ranking component 106 (not shown) to rank a result set such that the most relevant electronic documents in the result set are presented to a user first, according to descending relevance.

Figure 4:
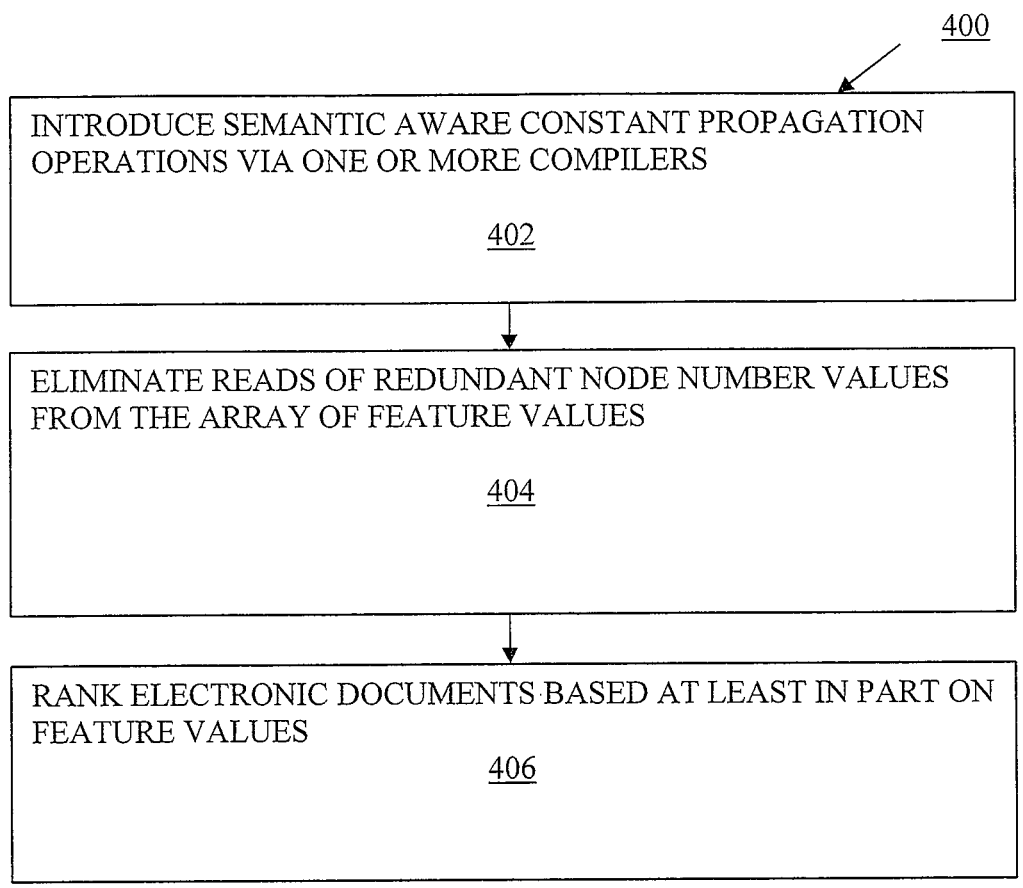
FIG. 4 is a flow diagram illustrating a procedure for eliminating reads of redundant node number values from an array of feature values for use in ranking of electronic documents in accordance with one or more embodiments.

Procedure 400, as illustrated in FIG. 4, may be used to eliminate reads of redundant node number values from an array of feature values for use in ranking of electronic documents in accordance with one or more embodiments, for example, although the scope of claimed subject matter is not limited in this respect. Additionally, although procedure 400, as shown in FIG. 4, comprises one particular order of blocks, the order in which the blocks are presented does not necessarily limit claimed subject matter to any particular order. Likewise, intervening blocks shown in FIG. 4 and/or additional blocks not shown in FIG. 4 may be employed and/or blocks shown in FIG. 4 may be eliminated, without departing from the scope of claimed subject matter.

As illustrated, procedure 400 may be used for eliminating reads of redundant node number values from an array of feature values for use in ranking of electronic documents. During compilation, code associated with a ranking component 106 (FIG. 1) may be interpreted from a source code into executable instructions. During such an interpretation, a compiler component may define one or more operations with respect to an array of feature values for use in ranking of electronic documents. For example, such an array of feature values may be incorporated within ranking library 108 (FIG. 1). Procedure 400 may define one or more operations with respect to an array of feature values starting at block 402 where one or more semantic aware constant propagation operations may be introduced via one or more compilers. As used herein the term "semantic aware constant propagation" may refer to an operation that is capable of constant propagation based at least in part on an identifiable meaning of a given program function. Such a semantic aware constant propagation may substitute a constant for one or more redundant node number values from an array of feature values. At block 404, reads of the redundant node number values may be eliminated from the array of feature values based at least in part on such semantic aware constant propagation.

Such operations of procedure 400 may be partially illustrated by the following example portion of code:
    int nNodes=numNodes[i];
    . . .
where a read from an array "numNodes" may be eliminated by exploiting the fact that the value in each cell of the array numNodes may be equal and a constant. Based on this observation, such a constant may be defined and substituted at appropriate places during compilation. Such operations may differ from conventional constant propagation, as the conventional constant propagation may not exploit the fact that elements in the array numNodes are constant and may not eliminate the read from the array numNodes. Such an elimination of the read may in turn drive an elimination of the array numNodes itself thereby reducing the code size and improving processing efficiency.

At block 406, one or more electronic documents may be ranked via a document ranking component 106 (FIG. 1). Such a ranking may be based at least in part on feature values obtained from the modified array of feature values. As discussed above, once ranking component 106 has received a result set and corresponding feature values, ranking component 106 may determine an importance score associated with the electronic documents from the result set based at least in part on such feature values. Such an importance score may be assigned to electronic documents depending on the traversing one or more trees based at least in part on feature values associated with such electronic documents. Ranking component 106 may be capable of ranking such a result set such that the most relevant electronic documents in the result set are presented to a user first, based at least in part on such an importance score.

Referring to both FIGS. 3 and 4, experimental results implementing portions of one or more embodiments were obtained using a commercially available compiler (a GCC version 3.4.4 type compiler), a commercially available processor (Quad-Core Intel® Xeon® type processor), a production query log and an implementation of a machine learning-based ranking (MLR) library, such as ranking library 108 (FIG. 1). During experimentation, a program static analysis was performed in order to identify delinquent loads, such as L2 cache misses. As used herein, the term "delinquent loads" may refer to loads which induce a significant percentage of the total data cache misses. Based on the identification of such delinquent loads, prefetching techniques in accordance with one or more embodiments were developed in order to drive prefetching of such delinquent loads.

Experimental results found that ranking of electronic documents by ranking component 106 (FIG. 1), without implementing portions of one or more embodiments, may account for approximately 14% of a total query processing time of a search engine 102 (FIG. 1). In other words, an MLR library may have a 14% coverage. Such coverage of the MLR library was obtained using in-built non-intrusive hardware performance counters. For example, hardware performance counters were utilized to identify source level causes of performance degradation during the scoring process. An L2_LINES_IN.SELF.DEMAND counter may indicate a number of L2 cache misses, and may be used to determine which data items to prefetch and/or which data items to avoid being thrown out of the L2 cache, for example. Accordingly, an optimization of an MLR library may reduce a query processing time and may in turn improve a ratio of commercial expense per query. As a result, improved efficiency in an MLR library may reduce the query processing time and may enable processing of a larger number of queries at a similar commercial expense. Additionally or alternatively, improved efficiency in an MLR library may allow more processing intensive queries to be performed at a similar commercial expense.

Experimental results implementing prefetching techniques in accordance with one or more embodiments speed up the experimental implementation of an MLR library by approximately 15%. Interaction of a ranking component 106 (not shown) with an MLR library may be optimized via software prefetching techniques as well as other assist optimizations, such as semantic-aware constant propagation, as described above with respect to FIGS. 3 and 4, respectively. For example, the prefetching techniques described in FIG. 3 may be compiler based techniques. In other words, source code of search engine 102 (FIG. 1) may be modified during compilation so as to incorporate the prefetching techniques described in FIG. 3. Further, performance gains achieved via software prefetching techniques in accordance with one or more embodiments may be in addition to what can be achieved with the hardware prefetching alone. For example, experimental results implementing prefetching techniques in accordance with one or more embodiments were performed while the two-level hardware prefetchers of the experimental processor were simultaneously operating.

The experimental analysis identified L2 cache misses as accounting for a large percentage of the total number of resource stalls. Specifically, delinquent loads which accounted for many of the L2 data cache misses were identified in relation to the code snippet below:

```
for each tree
    ...
    // Traverse the tree
    while (1) {
        ...
        nextNode = (fValue[tn.fname] < tn.threshold ? tn.left : tn.right);
        ...
    }
    __score += leaves[nextNode – 15];
    ...
end for
``` where the item "fValue[tn.fname]" corresponding with feature values associated with interior nodes and the item "leaves" corresponding with feature values associated with leaf nodes of a given tree were identified as corresponding with delinquent loads.

In order to mitigate the effect of the delinquent loads associated with interior node and leaf feature values, compiler based prefetching techniques were introduced, as illustrated in FIG. 3. Specifically, both the outer for loop and the inner while loop were altered during compilation so as to prefetch the memory locations corresponding with interior node and leaf feature values. Introduction of such prefetching in both the outer for loop and the inner while loop may minimize the performance impact of L2 data cache misses. The penalty of incurring L2 cache misses may be very high. Given that loop iterations may be done many times, L2 cache misses in such cases may be all the more pronounced. Such compiler based prefetching techniques as described herein may not be supported in the widely used GCC compiler, version 3.4.4.

Based at least in part on operations described at block 302 of FIG. 3, an operation of prefetching of feature values associated with subsequent leaf nodes of a given tree was introduced during compilation. Experimental results illustrated a performance gain based on an implementation of block 302 as yielding approximately a 2.8% performance gain.

Based at least in part on operations described at block 308 of FIG. 3, an operation of prefetching of feature values associated with a subsequent interior node associated with the current node of the given tree currently being traversed was introduced during compilation. Experimental results illustrated a performance gain based on an implementation of block 308 as yielding approximately an 8% performance gain in addition to the performance gain associated with block 302.

Based at least in part on operations described at block 304 of FIG. 3, an operation of prefetching of feature values associated with a subsequent root node of a subsequent tree associated with a given tree currently being traversed was introduced during compilation. Experimental results illustrated a performance gain based on an implementation of block 304 as yielding approximately a 4.25% performance gain in addition to the performance gain associated with blocks 302 and 308.

Based at least in part on operations described at blocks 402 and 404 of FIG. 4, reads of redundant node number values from an array of feature values were eliminated during compilation. Experimental results illustrated a performance gain based on an implementation of blocks 402 and 404 as yielding approximately a 1.1% performance gain.

Procedures 300 and/or 400 illustrated in FIGS. 3 and 4 may be compiler-based. Accordingly, procedures 300 and/or 400 may not require any algorithmic changes to search engine 102 (not shown) and/or may not require any hardware changes in a computer platform executing search engine 102. Procedures 300 and/or 400 may reduce a query processing time and/or improves a cost per query ratio. Accordingly, procedures 300 and/or 400 may permit processing of a larger number of queries. Furthermore, the gains achieved via procedures 300 and/or 400 may be compounded based on query processing done over a cluster of tens of thousands of nodes.

Figure 5:
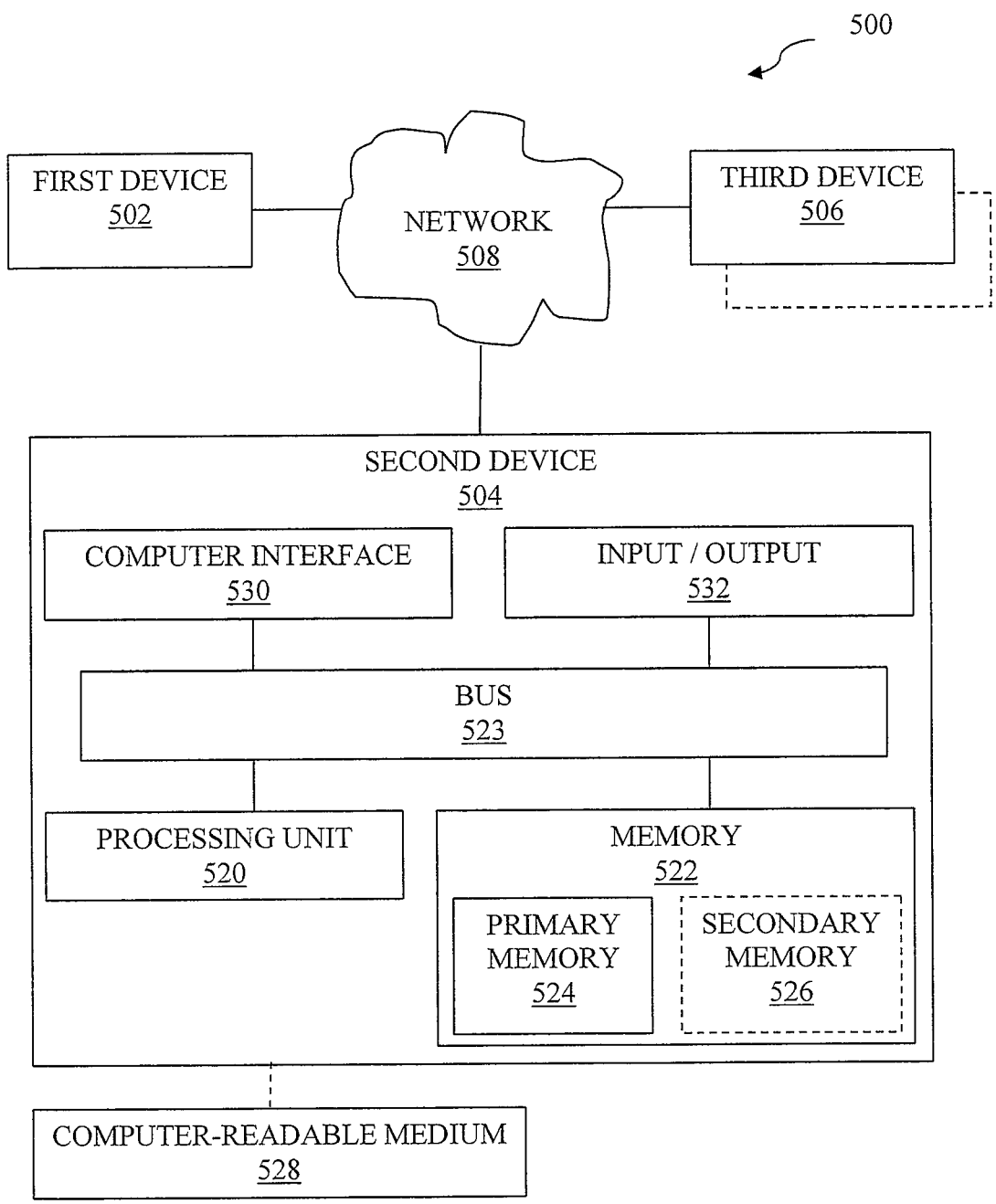
FIG. 5 is a schematic diagram of a computing platform in accordance with one or more embodiments.

FIG. 5 is a schematic diagram illustrating an exemplary embodiment of a computing environment system 500 that may include one or more devices configurable to rank electronic documents using one or more techniques illustrated above, for example. System 500 may include, for example, a first device 502, a second device 504, and a third device 506, which may be operatively coupled together through a network 508.

First device 502, second device 504, and third device 506, as shown in FIG. 5, may be representative of any device, appliance or machine that may be configurable to exchange data over network 508. By way of example, but not limitation, any of first device 502, second device 504, or third device 506 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 508, as shown in FIG. 5, is representative of one or more communication links, processes, and/or resources configurable to support the exchange of data between at least two of first device 502, second device 504, and third device 506. By way of example, but not limitation, network 508 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 506, there may be additional like devices operatively coupled to network 508.

It is recognized that all or part of the various devices and networks shown in system 500, and the processes and methods as further described herein, may be implemented using, or otherwise including, hardware, firmware, software, or any combination thereof.

Thus, by way of example, but not limitation, second device 504 may include at least one processing unit 520 that is operatively coupled to a memory 522 through a bus 523.

Processing unit 520 is representative of one or more circuits configurable to perform at least a portion of a data computing procedure or process. By way of example, but not limitation, processing unit 520 may include one or more processors, controllers, microprocessors, microcontrollers, application specific integrated circuits, digital signal processors, programmable logic devices, field programmable gate arrays, and the like, or any combination thereof.

Memory 522 is representative of any data storage mechanism. Memory 522 may include, for example, a primary memory 524 and/or a secondary memory 526. Primary memory 524 may include, for example, a random access memory, read only memory, etc. While illustrated in this example as being separate from processing unit 520, it should be understood that all or part of primary memory 524 may be provided within or otherwise co-located/coupled with processing unit 520.

Secondary memory 526 may include, for example, the same or similar type of memory as primary memory and/or one or more data storage devices or systems, such as, for example, a disk drive, an optical disc drive, a tape drive, a solid state memory drive, etc. In certain implementations, secondary memory 526 may be operatively receptive of, or otherwise configurable to couple to, a computer-readable medium 528. Computer-readable medium 528 may include, for example, any medium that can carry and/or make accessible data, code and/or instructions for one or more of the devices in system 500.

Second device 504 may include, for example, a communication interface 530 that provides for or otherwise supports the operative coupling of second device 504 to at least network 508. By way of example, but not limitation, communication interface 530 may include a network interface device or card, a modem, a router, a switch, a transceiver, and the like.

Second device 504 may include, for example, an input/output 532. Input/output 532 is representative of one or more devices or features that may be configurable to accept or otherwise introduce human and/or machine inputs, and/or one or more devices or features that may be configurable to deliver or otherwise provide for human and/or machine outputs. By way of example, but not limitation, input/output device 532 may include an operatively configured display, speaker, keyboard, mouse, trackball, touch screen, data port, etc.

With regard to system 500, in certain implementations, first device 502 may be configurable to tangibly embody all or a portion of procedure 100 of FIG. 1, procedure 300 of FIG. 3 and/or procedure 400 of FIG. 4. In certain implementations, first device 502 may be configurable to rank electronic documents using one or more techniques illustrated above. For example, we can apply a process in first device 502 where data may be prefetched for use in ranking of electronic documents. During compilation, code associated with a ranking component may be interpreted via first device 502 from a source code into executable instructions. During such an interpretation, a compiler component may introduce and/or define one or more prefetching operations. Such prefetching may be utilized to supply first device 502 with data in a timely manner. For example, such prefetching operations may comprise prefetching one or more feature values from a main memory into an L2 cache of a multilevel cache. Multi-level caches may generally operate to address tradeoffs between cache latency and cache misses. Multi-level caches may generally operate by checking a smallest Level 1 (L1) cache first. If there are no cache misses, the processor may proceed at high speed based on the data from L1 cache. If L1 cache misses, the next larger cache (L2) may be checked, and so on, before a main memory is checked. Additionally or alternatively, we can apply a process in first device 502 where reads of redundant node number values from an array of feature values may be eliminated. During compilation, code associated with a ranking component may be translated via first device 502 from a code into executable instructions. During such an interpretation, a compiler component may define one or more operations with respect to an array of feature values for use in ranking of electronic documents. Such modifications of an array of feature values may be utilized to reduce the processing demand on first device 502.

Embodiments claimed may include algorithms, programs and/or symbolic representations of operations on data bits or binary digital signals within a computer memory capable of performing one or more of the operations described herein. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the preceding discussion, it is appreciated that throughout this specification discussions utilizing terms such as processing, computing, calculating, selecting, forming, transforming, defining, mapping, converting, associating, enabling, inhibiting, identifying, initiating, communicating, receiving, transmitting, determining, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes that fall within the true spirit of claimed subject matter.

What is claimed is:

1. A method, comprising:
prefetching, by one or more processors, one or more feature values associated with one or more electronic documents, at least partially in response to initiating of traversal of one or more decision trees, wherein said one or more feature values are prefetched from a main memory into a cache, said one or more feature values indicating a relationship between one or more aspects of the one or more electronic documents and one or more terms or a search query or to one or more topical categories of information;
comparing said one or more feature values with one or more threshold values of one or more subsequent nodes of said one or more decision trees being traversed at least partially in response to said prefetching; and
ranking said electronic documents via a document ranking component, wherein said ranking is based at least in part on said comparing said one or more feature values.

2. The method of claim 1, wherein said prefetching is defined according to one or more compiler components.

3. The method of claim 1, wherein said cache comprises an L2 cache of a multilevel cache.

4. The method of claim 1, wherein said prefetching comprises prefetching at least a portion of said one or more feature values associated with a subsequent interior node associated with a current node of said one or more decision trees currently being traversed.

5. The method of claim 1, wherein said prefetching comprises prefetching at least a portion of said one or more feature values associated with subsequent leaf nodes of said one or more decision trees currently being traversed.

6. The method of claim 1, wherein said prefetching comprises prefetching at least a portion of said one or more feature values associated with a subsequent root node of a subsequent decision tree associated with said one or more decision trees currently being traversed.

7. The method of claim 1, wherein said prefetching comprises:
prefetching at least a portion of said one or more feature values associated with subsequent leaf nodes of said one or more decision trees currently being traversed;
prefetching at least a portion of said one or more feature values associated with a subsequent root node of a subsequent decision tree associated with said one or more decision trees currently being traversed; and
prefetching at least a portion of said one or more feature values associated with a subsequent interior node associated with a current node of said one or more decision trees currently being traversed.

8. The method of claim 1, wherein said prefetching comprises:
prefetching at least a portion of said one or more feature values associated with subsequent leaf nodes of said one or more decision trees currently being traversed;
prefetching at least a portion of said one or more feature values associated with a subsequent root node of a subsequent decision tree associated with said one or more decision trees currently being traversed;
comparing a current feature value against a current threshold value at a current node of said one or more decision trees currently being traversed; and
prefetching at least a portion of said one or more feature values associated with a subsequent interior node associated with said current node of said one or more decision trees currently being traversed.

9. The method of claim 1, further comprising:
introducing one or more semantic aware constant propagation operations via one or more compilers, wherein said semantic aware constant propagation is capable of substituting a constant for one or more redundant node number values from an array of feature values; and
eliminating reads of said redundant node number values from said array of feature values based at least in part on said semantic aware constant propagation.

10. A method, comprising:
introducing one or more semantic aware constant propagation operations via one or more compilers, wherein said semantic aware constant propagation is capable of substituting a constant for one or more redundant node number values from an array of feature values;
eliminating reads of said redundant node number values from said array of feature values, by one or more processors, based at least in part on said semantic aware constant propagation; and
ranking one or more electronic documents via a document ranking component, wherein said ranking is based at least in part on said feature values, said one or more feature values indicating a relationship between one or more aspects of the one or more electronic documents and one or more terms or a search query or to one or more topical categories of information.

11. The method of claim 10, wherein said one or more electronic documents comprise web pages.

12. An article comprising:
a storage medium comprising machine-readable instructions stored thereon which are executable by a computing platform to:
prefetch one or more feature values associated with one or more electronic documents, at least partially in response to initiating of traversal of one or more decision trees, from a main memory into a cache, said one or more feature values indicating a relationship between one or more aspects of the one or more electronic documents and one or more terms or a search query or to one or more topical categories of information;
comparing said one or more feature values with one or more threshold values of one or more subsequent nodes of said one or more decision trees being traversed at least partially in response to said prefetching; and
rank said electronic documents via a document ranking component, wherein said rank is based at least in part on said comparing said one or more feature values.

13. The article of claim 12, wherein said prefetch is defined according to one or more compiler components.

14. The article of claim 12, wherein said cache comprises an L2 cache of a multilevel cache.

15. The article of claim 12, wherein said prefetch comprises:
prefetch at least a portion of said one or more feature values associated with subsequent leaf nodes of said one or more decision trees currently being traversed;
prefetch at least a portion of said one or more feature values associated with a subsequent root node of a subsequent decision tree associated with said one or more decision trees currently being traversed;

compare a current feature value against a current threshold value at a current node of said one or more decision trees currently being traversed; and prefetch at least a portion of said one or more feature values associated with a subsequent interior node associated with said current node of said one or more decision trees currently being traversed.

16. An apparatus comprising: a computing platform to:

prefetch one or more feature values associated with one or more electronic documents from a main memory into a cache, at least partially in response to initiating of traversal of one or more decision trees, said one or more feature values indicating a relationship between one or more aspects of the one or more electronic documents and one or more terms or a search query or to one or more topical categories of information;

compare said one or more feature values with one or more threshold values of one or more subsequent nodes of said one or more decision trees being traversed at least partially in response to said prefetching; and rank said electronic documents via a document ranking component, wherein said rank is based at least in part on a comparison of said one or more feature values.

17. The apparatus of claim 16, wherein said prefetch is defined according to one or more compiler components.

18. The apparatus of claim 16, wherein said cache comprises an L2 cache of a multilevel cache.

19. The apparatus of claim 16, wherein said prefetch comprises:

prefetch at least a portion of said one or more feature values associated with subsequent leaf nodes of said one or more decision trees currently being traversed;

prefetch at least a portion of said one or more feature values associated with a subsequent root node of a subsequent decision tree associated with said one or more decision trees currently being traversed;

compare a current feature value against a current threshold value at a current node of said one or more decision trees currently being traversed; and prefetch at least a portion of said one or more feature values associated with a subsequent interior node associated with said current node of said one or more decision trees currently being traversed.

20. The apparatus of claim 16, wherein said prefetch is defined according to one or more compiler components;

wherein said prefetch comprises a prefetch of said one or more feature values from a main memory into an L2 cache of a multilevel cache; and wherein said prefetch comprises:

prefetch at least a portion of said one or more feature values associated with subsequent leaf nodes of said one or more decision trees currently being traversed, prefetch at least a portion of said one or more feature values associated with a subsequent root node of a subsequent decision tree associated with said one or more decision trees currently being traversed, compare a current feature value against a current threshold value at a current node of said one or more decision trees currently being traversed, and prefetch at least a portion of said one or more feature values associated with a subsequent interior node associated with said current node of said one or more decision trees currently being traversed.

* * * * *